United States Patent [19]

Waite

[11] Patent Number: 4,600,308
[45] Date of Patent: Jul. 15, 1986

[54] PHASE-MATCHING ARRAYED TELESCOPES WITH A CORNER-CUBE-BRIDGE METERING ROD

[75] Inventor: Thomas R. Waite, Canoga Park, Calif.

[73] Assignee: Rockwell International Corporation, El Segundo, Calif.

[21] Appl. No.: 544,291

[22] Filed: Oct. 21, 1983

[51] Int. Cl.[4] .............................................. G01B 11/14
[52] U.S. Cl. .................... 356/363; 350/102; 356/358
[58] Field of Search ............................ 356/354–356, 356/358–360, 349, 363; 350/102

[56] References Cited

U.S. PATENT DOCUMENTS

| | | | |
|---|---|---|---|
| 3,836,256 | 9/1974 | Peters | 356/360 X |
| 3,923,378 | 12/1975 | Heenan | 350/102 X |
| 4,053,231 | 10/1977 | Fletcher et al. | 356/363 |
| 4,136,954 | 1/1979 | Jamieson | 356/349 |

Primary Examiner—Davis L. Willis
Assistant Examiner—Robert D. V. Thompson, III
Attorney, Agent, or Firm—H. Fredrick Hamann; Harry B. Field; Lawrence N. Ginsberg

[57] ABSTRACT

A system for phase-matching arrayed telescopes by means of a corner-cube-bridge metering rod comprises a plurality of arrayed telescopes 10, a source 30 of laser light reflecting means 32,40,42,44,46 for directing the laser beam through the telescopes 10, one of the reflecting means being a beam splitter 42 for directing a different portion of the laser beam through each telescope 10, an absolute distance interferometer (ADI) 38, boresighting means including a hole plate 32, a focusing lens 34 and an alignment sensor 36, and a metering rod 16 carrying four corner-reflector cubes, two near each end. The ADI beam is aligned with the laser source beam by using the boresighting means. The metering rod 16 is mounted between two adjacent telescopes 10 so that two adjacent corner cubes reflect the beam coming through one telescope and the other two adjacent cubes reflect the beam coming through the other telescope. The ADI 38 is then used to measure the optical path length (OPL) of the beam reflected from each corner cube 22,24,26 and 28. The deviation of each OPL from the others is adjusted by an optical trombone 44,48 in each optical path to change the path lengths so as to bring them all into equality, or identical phase.

11 Claims, 5 Drawing Figures

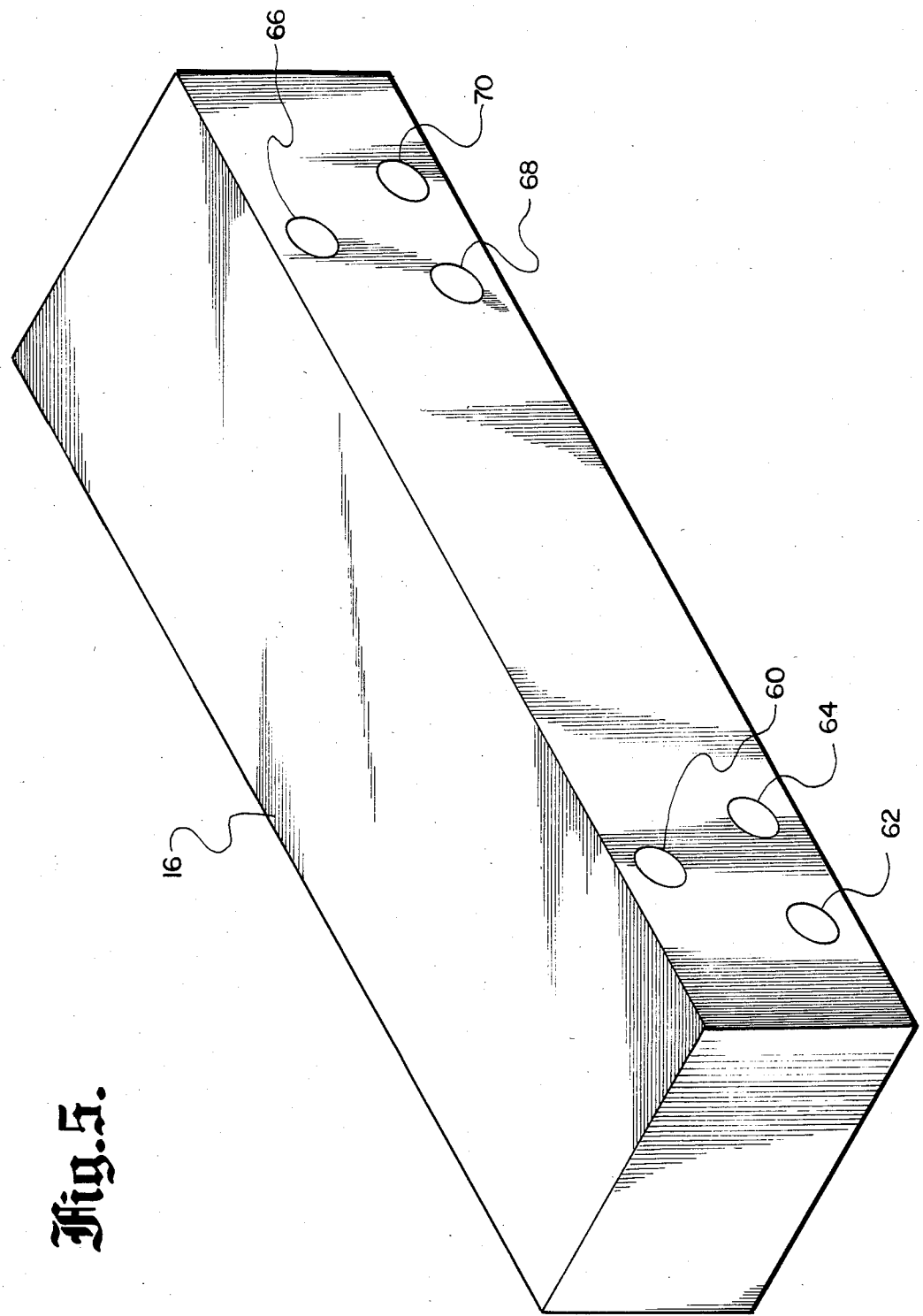

PHASE-MATCHING ARRAYED TELESCOPES WITH A CORNER-CUBE-BRIDGE METERING ROD

BACKGROUND OF THE INVENTION

1. Field of the Invention

This invention relates to the phase-matching of telescopes in an array fed by a common coherent source and especially to the phase-matching of such telescopes by means of a corner-cube-bridge metering rod.

2. Description of the Prior Art

The high-energy laser (HEL) has great potential as a weapon system due to its ability to deliver large quantities of energy concentrated on a small area at great distances over precisely predictable trajectories at the speed of light. The intensity at the target is proportioned to $(DP/\lambda R)^2$ where D is the transmitter aperture diameter, $\lambda$ is the radiation wavelength, P is the transmitted power, and R is the range. The transmitter telescope diameter D is limited by fabrication technology and other practical considerations. A number (N) of telescopes each of diameter (d) and power (p) may be used in an array, but the intensity at the target is only proportional to $N(dp/\lambda R)^2$. However, if the radiation through the (N) telescopes can be brought into phase on the target, the intensity increases to $N^2(dp/\lambda R)^2$. This requires precise path-length equality on all optical paths from a common coherent laser source through each of the separate telescopes to the target. The present invention provides means for measuring path length differences between the telescopes in an array and eliminating the differences.

Similar considerations apply to an array of telescopes observing light from a remote source. Path-length differences through the telescopes affect intensity and resolution in the common focal plane in much the same way.

The common coherent source mentioned above may be laser beams transmitted outwardly through the array of telescopes to a common remote target or a distance source, such as a star, whose light is received by the array and brought to a common focal point.

OBJECTS OF THE INVENTION

An object of the invention is to measure the path length differences for the various telescopes in an array.

Another object is to reduce to zero measured path length differences between the various telescopes in an array.

SUMMARY OF THE INVENTION

The objects and advantages of the present invention are achieved in arrays of subaperture telescopes, as might be used for laser power transmission or astronomical applications, by utilizing a rod with a number of small corner-cube reflectors attached as a reference for phase-matching each pair of adjacent telescopes. An absolute distance interferometer (ADI) injects a diagnostic laser beam into the main beam train. The diagnostic beam is divided into smaller beams which propagate along the subaperture beam train paths and pass through the subaperture telescopes. A metering rod is placed so as to bridge the outgoing diagnostic beams from adjacent subaperture telescopes. If a series of small retroreflecting corner cubes are attached to the metering rod, substantially in a straight line, these retroreflectors will return these wavefront samples back through the beam train to the ADI where the samples from one subaperture are compared indirectly to those from the adjacent subaperture through a common reference beam. The ADI is a two-wavelength digital heterodyne interferometer. The ADI measures absolute phase, thus establishing the absolute optical path length (OPL) between the interferometer and corner cubes. Differences in beam path are then adjusted to any required zero or nonzero value by path-length-adjusting means, such as optical trombones, incorporated in the beam path. Testing for colinearity of the reference corner cubes on the metering rod eliminates errors due to metering rod misalignment.

The retroflectors can also be arranged in groups of three at each end of the metering rod so as to form a plane at each end, the two planes being arranged to be coplanar. The testing can then be for coplanarity of the planes formed by the retroreflectors. Other objects, advantages and novel features of the present invention will become apparent from the following detailed description of the invention when considered in conjunction with the accompanying drawing.

BRIEF DESCRIPTION OF THE DRAWINGS

FIG. 5 is an isometric drawing of a coplanar metering-rod bridge phasor.

The same elements or parts throughout the figures of the drawing are designated by the same reference characters.

DETAILED DESCRIPTION OF THE PREFERRED EMBODIMENTS

Figure 1:
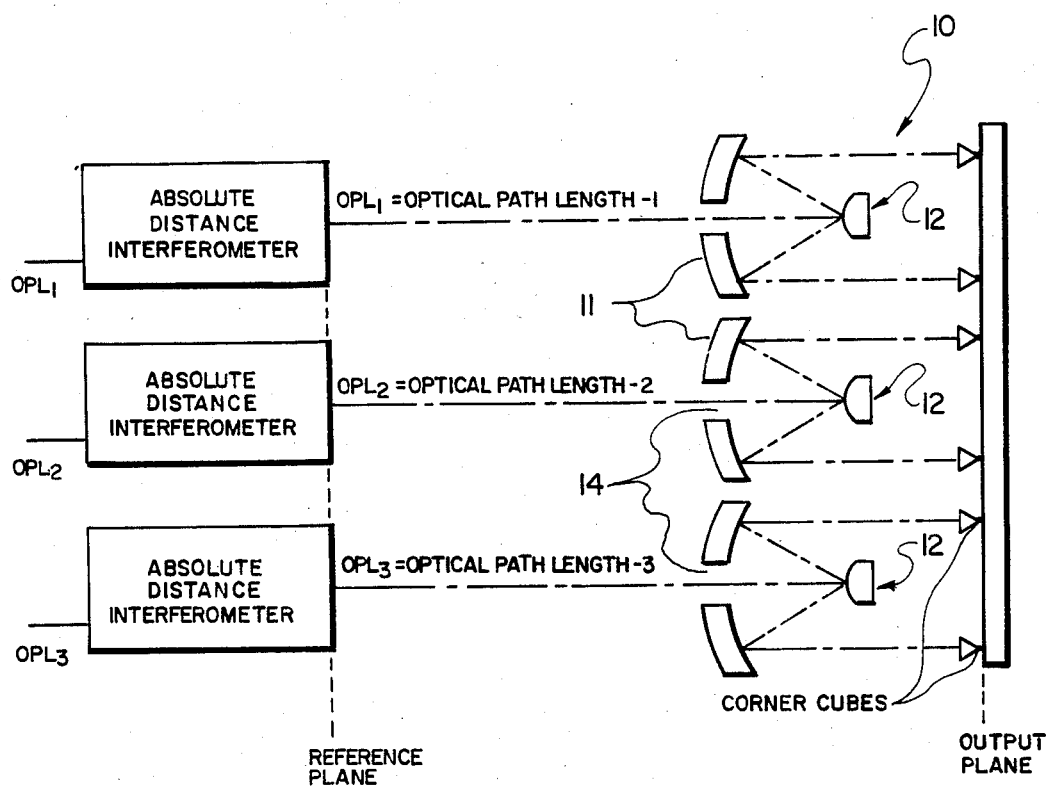
FIG. 1 is a schematic diagram illustrating the subaperture phasing problem.

FIG. 1 shows the optical paths $OPL_1$, $OPL_2$ and $OPL_3$ from a reference plane to an output plane through three telescopes 10 each having an object, or primary, mirror 11 and a small, secondary mirror 12. The object mirror 10 has a central opening 14 to allow light to pass through. Light through the three telescopes 10 from the reference plane to the output (or target) plane is in-phase, or the subapertures are said to be in-phase, when the light through all subapertures has the same optical path length (OPL), i.e., when $OPL_1 = OPL_2 = OPL_3$. In the discussion herein, correct alignment of the beam train components from the input to the output of the system is assumed, i.e., if the system is a laser power transmitter, proper alignment from the laser source through the output apertures of the telescope and if the system is an array of astronomical telescopes viewing a star, proper alignment from the input apertures of the telescopes to the viewing eyepiece.

Figure 2:
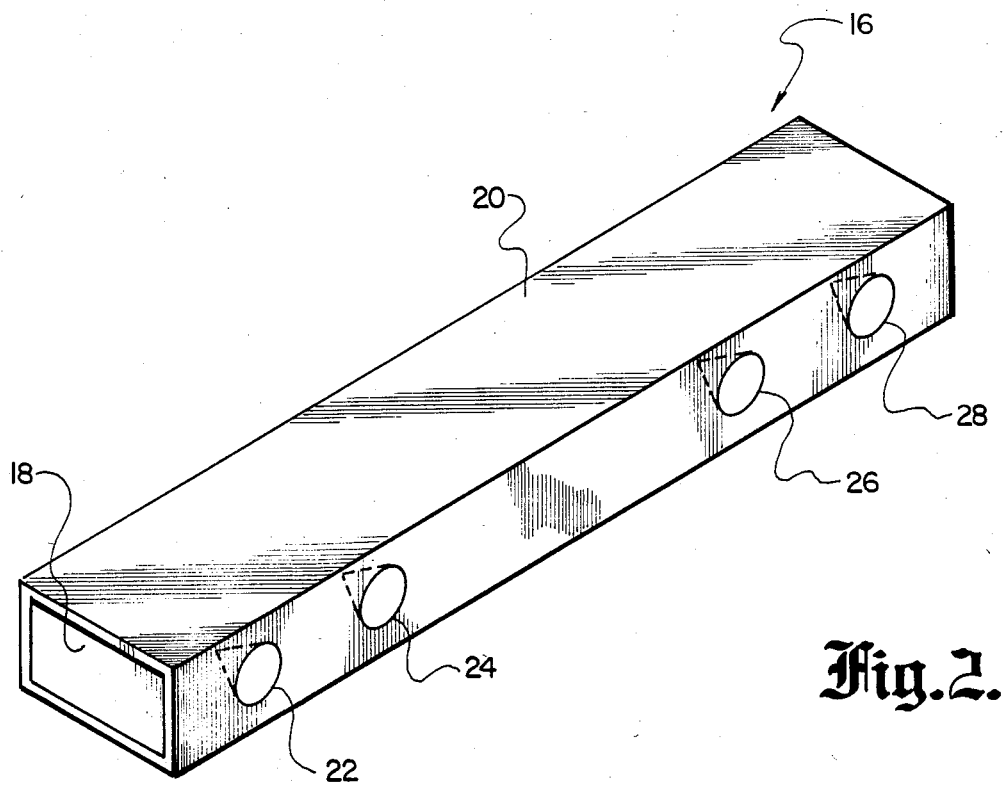
FIG. 2 is an isometric drawing of a colinear metering-rod bridge phasor.

The present invention provides a means and technique for determining a difference in the OPL between any two adjacent subapertures. To do this, a metering-rod bridge phasor 16 is employed (see FIG. 2). The phasor 16 is a rod fabricated from a core 18 of a low thermal expansion material, such as ULE glass (fused quartz), covered with a multi-layer 20 of heat-insulating material, such as polyurethane foam. The phasor 16 should be as resistant to thermal expansion as it is possible to make it. Four light-reflecting corner cubes 22,24 and 26 and 28 are preferably embedded in the core structure, two at each end of the rod, although it is possible to use two at one end and only one at the other. The cubes are aligned with each other to form a straight line along the length of the rod, and are embedded in the ULE core for better thermal and mechanical stability. Although in FIG. 2 the corner-cube retroreflectors 22,24,26, and 28 are drawn as cones for simplicity of illustration, they are corner reflectors with three, flat orthogonally-related sides meeting in a corner.

Figure 3:
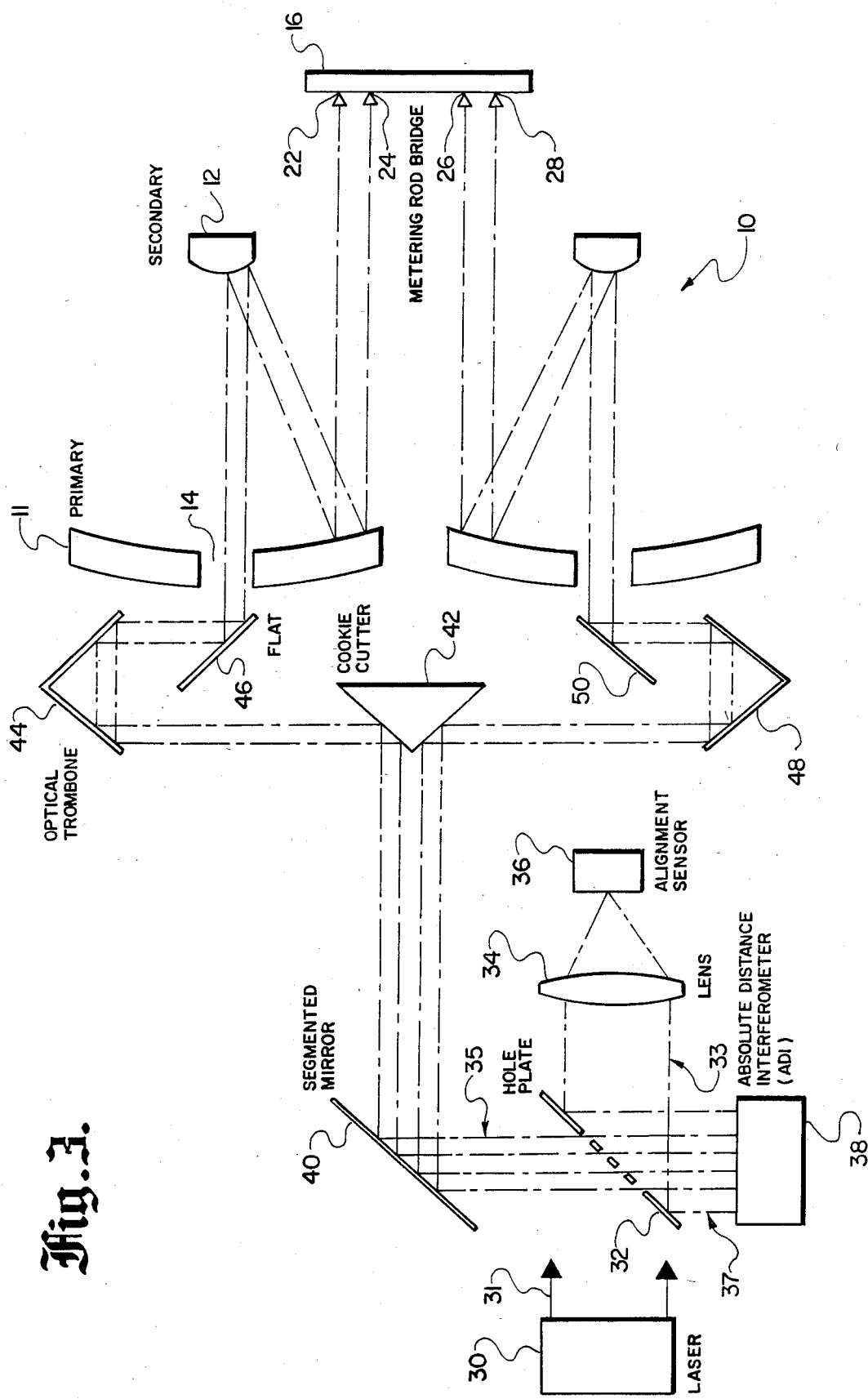
FIG. 3 is a schematic diagram showing the use of a phasor in a telescope array system for focusing laser light on a target.

FIG. 3 shows a laser system for propagating a beam from a laser 30 through an array of telescopes 10 (only two of which are shown) to a target (not shown). FIG. 3 shows a metering-rod bridge phasor 16 at the far right. The phasor 16 in actual practice would be attached to the outer rigid structure of one of the telescopes.

The beam 31 of the laser 30 is directed upon a hole plate 32, which is a mirror with holes bored through it. The holes permit laser-beam rays 33, called the boresight beam, to pass through to a lens 34 which focuses the rays to a spot on an alignment sensor 36. The plate 32 also reflects part of the laser beam 31, called the telescope beam, to a mirror 40. An absolute distance interferometer (ADI) 38, which is an interferometer that measures optical path length to an accuracy of $10^{-6}$ cm, directs its own laser beam 37 onto the back of the hole plate 32 which reflects the portion of the beam 33 that does not pass through the holes to the lens 34 which focused the beam to a spot on the alignment sensor 36, which is a light-strength meter such as a photometer, for example. If the alignment sensor 36 indicates by its reading that the focused spots of both laser beams are coincident, the laser 30 and the ADI 38 have identical boresights; if not, the orientation and position of the ADI 38 can be adjusted to make the focused spots coincide.

The hole plate 32 allows some of the laser beam 37 generated by the ADI 38 to pass through its holes to a mirror 40, which reflects it upon a cookie cutter 42. The latter is simply an optical device which is a beam splitter, splitting the light beam coming from the mirror 40 into two parts, a different part for each optical trombone 44 and 48. The cookie cutter 42 can be fabricated to split the beam into additional parts, according to the number of telescopes in the array. The cookie cutter 42 may be formed, for example, from a close-packed array of flat hexagonal mirrors, each tilted at a different angle so that a beam impinging on the cookie cutter is reflected as a plurality of beams each directed along a different path.

The optical trombone is simply a reflecting device which can be moved by a piston to increase or decrease the path length of the beam which impinges on it without displacing or misorienting the beam.

The beam reflected by each trombone, e.g., 44, is directed through the central opening e.g., 14, of the object mirror, e.g., 11, of one of the telescopes, e.g., the upper one in FIG. 3. The beam is then reflected from the secondary mirror 12 and directed back to the object mirror 11 and thence to the corner reflectors, e.g., 22 and 24, of the metering-rod phasor 16. The beam from the lower telescope is directed on the lower two corner reflectors 26, 28 of the bridge phasor 16. The corner cubes reflect their portions of the beam back along the same path to the ADI 38.

The ADI 38 is a multiple wavelength, digital heterodyne interferometer which is known to the optical art and thus will be discussed only briefly herein. It is a broad beam interferometer of the Mach-Zender and Twyman-Green type which is modified by adding a second laser and Bragg cell pair to produce four superimposed beams of two orthogonal polarizations and two different wavelengths. The two-wavelength combination generates a synthetic wavelength $$\lambda_s = \frac{\lambda_1 \lambda_2}{\lambda_1 - \lambda_2}$$

where $\lambda_s$ is the synthetic wavelength, $\lambda_1$ is the wavelength of one laser and $\lambda_2$ is the wavelength of the other laser. If one laser is a fixed-line laser and the other a tunable laser, then a series of overlapping synthetic wavelengths can be generated which range from about one centimeter down to optical wavelengths. The ADI 38 not only can measure the optical path length of its reflected beam very accurately (to $10^{-6}$ cm.) but can do so unambiguously for up to a cm. of deviation.

Figure 4:
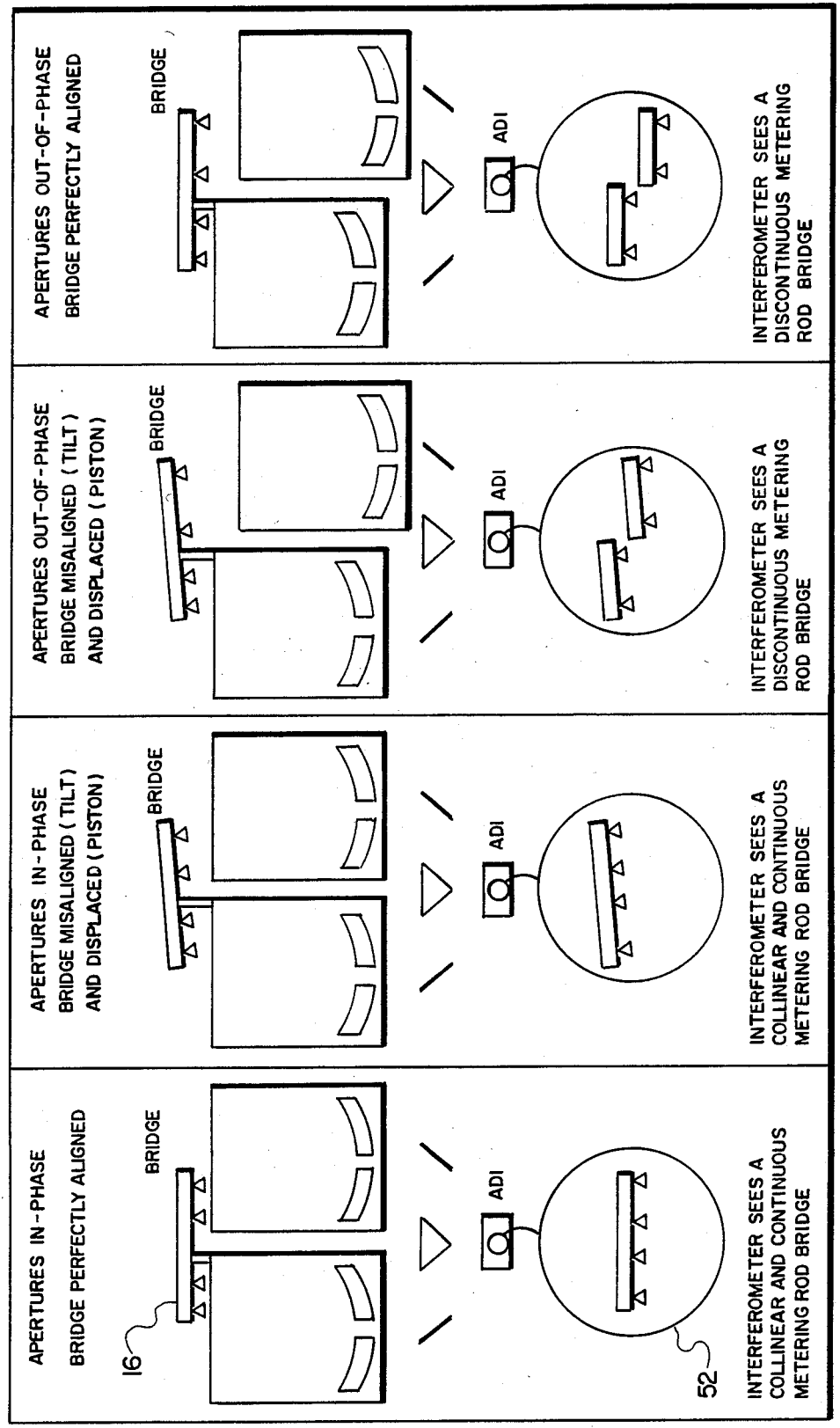
FIGS. 4a–4d are schematic diagrams illustrating figuratively what is seen by the interferometer under different possible test conditions.

The ADI 38 is used to individually measure the OPL of the beam reflected from each corner reflector and the results could be plotted on graph paper, for example. FIG. 4 shows conceptually, or figuratively, what is "seen" by the ADI, or really what is deducible from a line or lines drawn through the optical path lengths of the beams from the corner reflectors and laid out on graph paper.

Thus, if the subapertures are in-phase, i.e., the bridge 16 is perfectly aligned, the OPL's will all be equal and a straight line without tilt (indicated by the phasor rod in the circle 52) will be formed (FIG. 4a). If the subapertures are in-phase but the bridge 16 is tilted, the line formed by the ADI measurements will be a single, tilted line (FIG. 4b). If the subapertures are out-of-phase and the bridge 16 is tilted, the line formed by the ADI will actually be two discontinuous, tilted lines (FIG. 4c). If the subapertures are out-of-phase and the bridge 16 is perfectly aligned, the line formed by the ADI measurements will be two discontinuous, nontilted lines (see FIG. 4d).

The bridge tilt can be corrected by correcting the angular orientation of the bridge phasor 16. The discontinuous lines, or out-of-phase condition can be corrected by adjusting the piston of one of the trombones to increase or decrease one of the optical path lengths. When this is accomplished, a different bridge 16, mounted between the next two telescopes, is observed and the procedure is repeated until all subapertures are in phase.

The metering rod 16 may require initial calibration measurements, since it is possible that the phasor 16 may be constructed so that one or more of the corner cubes is not exactly in line with the others. This can be done by placing the phasor so that it reflects the beam in one telescope only and measuring the OPD of each corner cube. The deviation in distance from the straight line formed by the OPD's of two or more of the cubes is determined and the measurements of the appropriate cubes are adjusted by their calibration deviations in all subsequent measurements.

Only three corner cubes are necessary (although four are preferred) to conceptually determine whether the corner cubes in front of two different telescopes lie on the same straight line (colinearity).

Coplanarity of the retroreflectors can be used as well as colinearity in determining the equality or deviation of the optical path lengths through two adjacent telescopes. Thus, at least three retroreflectors would be embedded at each end of the metering rod 16, since three points determine a plane. Each set of three retroreflectors would be positioned to form a plane and both planes would be aligned for coplanarity. This is shown in FIG. 5 where the corner cube retroreflectors 60,62,64 of one set are positioned to form a first plane and those of the second set 66,68,70 are positioned to form a second plane, the first and second planes being substantially coplanar. The preferred embodiment then would orient the two planes perpendicularly to the OPL's of the beams through the two adjacent telescopes, the OPL's of which are being adjusted. Tilt of the rod 16 and out-of-phase condition of the apertures would then be ascertainable as before. The phasing process would then adjust the OPL's of each retroreflected ray for equality after the tilt of the rod 16 was removed.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. Means for adjusting the optical path lengths in an arrayed telescope system having a plurality of arrayed telescopes, light-reflecting components and beam-splitter means, the arrayed telescope system deriving light from a source positioned at an input reference plane, splitting the light into several beams, and passing a different one of the split beams through each of the telescopes to rigid arrays of retroreflectors in an output plane, and back to the input reference plane, comprising:
    optical path length measurement means for sending a light beam along the optical path from the input reference plane to the output plane of each telescope, said optical path length measurement means capable of interferometrically measuring the distance traveled by beams of the coherent light which are retroreflected to said optical path length measurement means;
    path-length-adjustment means for individually adjusting the length of each optical path; and
    a rigid array of retroreflectors, each retroreflector coupled into a substantially coplanar array substantially transverse to the retroreflected beams with known, calibrated deviations from exact coplanarity to intercept output beams from two adjacent telescopes and reflect therefrom at least three retroreflected beams back along the optical paths to said optical path length measurement means which measures each of the path lengths individually, the apparent positions of each retroreflector relative to the input reference plane being determined and deviations from coplanarity of apparent positions of retroreflectors seen through one telescope with respect to the apparent positions of retroreflectors seen through an adjacent telescope being eliminated by said optical path length adjustment means so that the optical path lengths of the two telescopes are equalized.

2. Means as set forth in claim 1, wherein:
said rigid array of retroreflectors is formed with three corner-cube-reflectors, two for reflecting the beam of one said telescope, and one for reflecting the beam of said adjacent telescope, said substantially coplanar array being a substantially colinear array and said deviations from coplanarity of apparent positions of retroreflectors being apparent deviations from colinearity of apparent positions of retroreflectors.

3. Means as set forth in claim 2, wherein:
said retroreflecting means is a rigid rod having three corner-cube-reflectors supported thereby, two near one rod end for reflecting the beam of one said telescope and one near the other rod end for reflecting the beam of said adjacent telescope, said corner-cube-reflectors being arranged substantially along a straight line and said rod being located so that the straight line is substantially transverse to the optical paths of the beams that are retroreflected.

4. Means as set forth in claim 3, wherein:
said rigid rod is formed with a core of low-thermal-expansion material.

5. Means as set forth in claim 3, wherein:
said rigid rod is formed with a core of low-thermal-expansion material which is covered with at least one layer of thermally insulative material.

6. Means as set forth in claim 1, wherein:
said optical path length measurement means comprises an absolute distance interferometer.

7. Means as set forth in claim 1, wherein:
said path-length-adjustment means comprises a plurality of optical trombones, a different one for adjusting the length of each telescope's optical path.

8. Means as set forth in claim 1, further including:
second light means for sending a second light beam through said arrayed telescope system from the input to the output plane;
separating means for dividing said second light beam into a telescope beam and a boresight beam;
focusing means for focusing said boresight beam into a spot; and
light-measuring means upon which said focused spot of light is directed for indicating the strength of said spot of light, said separating means also being constructed to separate a beam from said optical path length measurement means into two parts, one being directed along the path of said telescope beam and one being directed through said focusing means to form a spot, the part being directed along the telescope-beam path being coincident with the telescope beam when the orientation and location of the optical path length measurement means is adjusted to cause its associated spot to coincide at the light-sensing means with the spot associated with the boresight beam of said second light means.

9. Means as set forth in claim 8, wherein:
said second light means is a laser-light source.

10. Means as set forth in claim 8, wherein:
said separating means is a plate having light-reflecting surfaces on both sides and a plurality of apertures therethrough.

11. Means as set forth in claim 8, wherein:
said light-measuring means is a photometer.

* * * * *